United States Patent [19]
Brooks et al.

[11] Patent Number: 4,960,549
[45] Date of Patent: Oct. 2, 1990

[54] PROCESS FOR PREPARING POLYAMIDE-IMIDE FOAM

[75] Inventors: Gary T. Brooks, Naperville; Brian C. Connolly, Aurora; Robert Riley, Plano, all of Ill.

[73] Assignee: Amoco Corporation, Chicago, Ill.

[21] Appl. No.: 197,208

[22] Filed: May 23, 1988

[51] Int. Cl.$^5$ ............................................. B29B 11/10
[52] U.S. Cl. ................................. 264/45.5; 264/46.1; 264/48; 264/53; 264/54; 264/148; 264/211.23
[58] Field of Search .................. 264/53, 54, 51, 45.9, 264/46.1, 45.5, 148, 48, 211.23

[56] References Cited

U.S. PATENT DOCUMENTS

| | | | |
|---|---|---|---|
| 3,300,420 | 1/1967 | Frey | 521/157 |
| 3,374,300 | 3/1968 | Azuma | 264/53 |
| 3,483,144 | 12/1969 | Longmeadow et al. | 521/180 |
| 3,494,890 | 2/1970 | Morello | 264/53 |
| 3,857,914 | 12/1974 | Aishima et al. | 264/46.1 |
| 3,926,911 | 12/1975 | Greber et al. | 528/26 |
| 3,948,835 | 4/1976 | Greber et al. | 525/431 |
| 4,016,140 | 4/1977 | Morello | 264/331.1 |
| 4,071,591 | 1/1978 | Kobayashi et al. | 264/45.5 |
| 4,167,620 | 9/1979 | Chen | 528/481 |
| 4,309,528 | 1/1982 | Keske et al. | 528/188 |
| 4,394,464 | 7/1983 | Gagliani et al. | 521/180 |
| 4,403,061 | 9/1983 | Brookes et al. | 524/433 |
| 4,426,463 | 1/1984 | Gagliani et al. | 521/180 |
| 4,539,336 | 9/1985 | Long et al. | 521/77 |
| 4,548,775 | 10/1985 | Hayashi et al. | 264/46.1 |
| 4,581,264 | 4/1986 | Emery et al. | 428/36 |
| 4,621,015 | 11/1986 | Long et al. | 264/54 |
| 4,639,343 | 1/1987 | Long et al. | 264/54 |
| 4,656,198 | 4/1987 | Shulman et al. | 264/53 |

FOREIGN PATENT DOCUMENTS 57-63231 4/1982 Japan .................................. 264/45.5

OTHER PUBLICATIONS

Amoco Chemical Corp., "Bulletin Ta-1a, Injection Molding Torlon Resins".
Modern Plastics Encyclopedia Buyers Guide, vol. 54, No. 10A, "Foam Processing Expandable PS Molding", by J. V. Wiman, pp. 294–302.

Primary Examiner—Jeffery Thurlow
Attorney, Agent, or Firm—Stephen Hensley; William H. Magidson; Ralph C. Medhurst

[57] ABSTRACT

This invention relates to preparation of polyamide-imide foam by extruding foamable composition comprising polyamide-imide and volatiles into a confined expansion zone, expanding the composition therein and cooling the result. The resulting foams are essentially open-celled and exhibit good strength, insulating properties and other desirable features.

8 Claims, 1 Drawing Sheet

PROCESS FOR PREPARING POLYAMIDE-IMIDE FOAM

This invention relates to preparation of polyamide-imide foam.

BACKGROUND OF THE INVENTION

Polyamide-imides are thermoplastic, high performance, engineering polymers finding use in many applications, such as adhesives, coatings, filled and unfilled molding compositions, fibers, films, composites, laminates, etc., owing to a desirable combination of mechanical strength, heat resistance, chemical inertness and other properties. Torlon ®polyamide-imides, available from Amoco Performance Products, Inc., of Ridgefield, Conn., are examples of commercial polyamide-imides.

It is known that volatiles, such as water and carbon dioxide, generated due to condensation, imidization and other reactions that occur in preparation, molding or other high temperature processing of polyimides or polyamide-imides, including their polyamide-amic acid precursors, or water vapor given off during such processing due to moisture absorbed by such polymers, can cause foaming. As a result, while seldom desired or intentionally produced, polyamide-imides of cellular structure have long been known and observed in various stages of polyamide-imide preparation and processing.

For example, it has been known for several years that polyamide-imides can foam when purged from the nozzle of the injection barrel of an injection molding machine. Published technical information related to Torlon ®engineering resins, Amoco Chemicals Corporation Bulletin TAT-la, discloses that in setting up for injection molding of such materials, purge shots should be examined for excessive foaming and that if the same occurs the material should be redried for 8–24 hours at 350° F. Injection molded parts with a cellular structure also can result when the amount of polymer injected into a mold is insufficient to fill it or, as disclosed in the above-mentioned Bulletin TAT-la, when mold closed time is too short. It also is well known that polyamide-imide parts prepared by extrusion may have voids.

While neither intended nor particularly desirable, it also is known that commercially available polyamide-imide pellets, generally having lengths and diameters up to about one-half inch (about 1.3 cm), can sometimes exhibit irregular cellular structures and densities below those of solid polymer. Pellets usually are prepared by plasticating polymer flake or powder using a screw conveyor, extruding the plasticated polymer through a strand die, continually removing strands of extrudate from the die, cooling the strands and chopping the cooled strands into pellets. When the softened extrudate exits the die, expansion of the strand due to volatiles liberated during plastication may result in formation of a cellular structure unless the strand is cooled sufficiently rapidly after exiting the die to prevent expansion. Of course, it is desirable to maximize pellet density to maximize throughput of resin and minimize packaging, shipping and other downstream handling and processing of gas(es) present in any cellular material. Accordingly, such efforts as are intentionally directed to controlling density in such pelletizing operations aim to maximize density and, thus, minimize foaming.

Commonly assigned U.S. Pat. No. 4,581,264 to Emery et al., issued Apr. 8, 1986, teaches that in production of articles of manufacture by extrusion of compositions comprising polyamide-imide, introducing air and moisture into the extrusion system is undesirable because articles that are foamed or have porosity can result. Emery et al. also teaches that use of a single-screw extruder is undesirable because parts having porosity can result.

Other examples of polyamide-imides having foamed or cellular structures are described in commonly assigned U.S. Pat. No. 4,167,620 to Chen, issued Sept. 11, 1979, directed to heat treating shaped articles comprising polyamide-imide to avoid foaming, distortion and sacrifices in properties resulting from thermal shock. Without such treatment, thermally shocked articles exhibit irregularly sized voids or cells, often distributed randomly throughout the articles. Blisters may be present on the surfaces of such articles. Physical properties generally are poor and frequently nonuniform throughout the articles. Chen is directed to preventing void formation and other deleterious results of thermal shock by heat treating polyamide-imide shaped articles to drive off volatiles without substantial distortion, formation of voids and other adverse effects. Commonly assigned U.S. Pat. No. 4,403,061 to Brooks et al., issued Sept. 6, 1983, avoids such undesirable effects, while reducing requirements for heat treatment, by adding to polyamide-imides metal oxides capable of tying up water that otherwise might contribute to foaming, distortion and other sacrifices.

As is known, polyamide-imide foams obtained as described above exhibit irregular, open-cell structure. Interconnected, randomly sized and shaped voids often vary in size, shape and distribution from one area of a foam to another. Such nonuniformity is hardly surprising given that foaming usually takes place only inadvertently, with efforts related to foaming being directed toward avoiding, rather than promoting, the same.

Polyamide-imide foams also have been produced intentionally. For example, foamed rods and boards of Torlon ®polyamide-imide prepared by extrusion using circular and sheet dies, respectively, and without rapid cooling of extrudate but otherwise similar to the above-described pelletizing procedure exhibit useful cell structure and other properties although control over foaming is limited. Satisfactory foam structure and properties also have been obtained by heating commercial Torlon ®polyamide-imide powder or pellets in a closed mold to above glass transition temperatures ("Tg") of the polymers, generally at about 65° to about 200° C. above Tg, for a time sufficient to soften and fuse the particles and cause absorbed and evolved volatiles to expand the polymer to fill the mold. Residence times in the mold can range from several minutes to several hours, with time and temperature being adjusted to achieve suitable softening, fusion and expansion without charring the surface of the final product. After heating, the mold is cooled to below Tg whereby the expanded cellular mass solidifies and a foamed shape conforming to the mold cavity is removed. Foaming of polyamide-imides by such a technique, sometimes referred to as confined free rise or confined free expansion foaming, is employed for fabrication of shaped articles of simple geometry such as panels, sheets and blocks.

Foamed polyamide-imides prepared by extrusion and confined free rise as described above have densities generally ranging from about 15 to about 50% of those of the unfoamed, starting polyamide-imides. In the case of Torlon ®polyamide-imides having unfoamed densities of about 1.4 g/cm$^3$, foam densities of about 0.2 to about 0.7 g/cm$^3$ (about 15–40 lb/ft$^3$) are commonly achieved by confined free rise foaming. The foams have a substantially open-cell structure of interconnected cells, generally of about 0.05 to about 0.5 inch (about 0.12–1.3 cm) diameter, compressive strengths of about 250 to about 800 psi (about 17–56 kg/cm$^2$), and K factor, indicative of thermal insulation and decreasing with decreasing density, of about 0.4 to about 1.2 btu in/ft$^2$ hr ° F. (about 1.38 $\times 10^{-4}$ – 4.13 $\times 10^4$ cal/sec cm ° C.). The foams char when exposed to flame, extinguishing on removal thereof. Screw fastener retention is sufficient to permit attachment with screws to or between other materials, e.g., metal, wood, concrete or foamed or unfoamed synthetic materials, or in a sandwich-type structure having such other materials between layers comprising polyamide-imide foam.

While such intentionally foamed polyamide-imides can exhibit useful properties, preparation thereof as described above suffers from poor control over foaming in the case of extrusion and is time-consuming and limited by mold and oven size and to shapes of simple geometry in the case of confined free rise foaming. Further, for a given polymer composition to be foamed by heating in a closed mold, variations in particle size of the particulate polymer placed in the mold can have a significant effect on process conditions required to achieve useful properties or on properties themselves. Larger particles retard diffusion of volatiles out of the mass of particles as it is heated to soften and fuse the same; if heating is too severe, for example, at too high a temperature or for too long a time, formation of char or large, irregular voids can result. Conversely, with smaller particles, heating at too low a temperature or too slowly can result in insufficient foaming due to loss of volatiles by diffusion prior to softening and fusing of the polymer.

Polyamide-imide foams also have been prepared intentionally by so-called short-shot injection techniques in which an amount of softened, fused polymer effective to yield a desired density without filling a mold is injected into the mold. Polymer in powdered or pellet form is introduced into a hopper and conveyed by a screw conveyor through a heated barrel of an injection press or like apparatus. As the polymer proceeds along the length of the barrel it softens, the softened particles fuse and volatiles are generated. Foaming of polymer in the barrel is substantially prevented by maintaining suitable back pressure within the barrel. A shut-off nozzle is used to maintain a melt seal in the barrel, preventing undesirable nozzle foaming prior to injection. From the exit end of the barrel the polymer and volatiles are forced into the mold, the amount injected and, in turn, density of the foam being prepared, being controlled by the length of the injection stroke. An example of a suitable injection press is a Natco 500 ton injection molding machine available from Natco Corporation. After rapid expansion of the foamable composition in the mold, the resulting expanded composition is cooled to below Tg and a foam with an outer skin of solid, unfoamed or essentially solid polyamide-imide is removed from the mold. Although more complex shapes can be prepared by short shot injection foaming than by confined free rise expansion, the former is expensive and limited to parts of higher densities than in confined free rise unless carried out with a heated mold which adds additional expense.

Polyamide-imide foams prepared by short shot injection foaming, like those prepared by confined free expansion, are of open cell structure, generally with cells of similar size and shape. Torlon ®polyamide-imide foams prepared by short shot injection foaming typically have densities of about 0.5 to 0.6 g/cm$^3$.

While not directed to solving problems encountered in such prior art methods, the following patents may be of interest in connection with this invention in disclosing various foams prepared by techniques in which volatiles generated during processing contribute to foaming U.S. Pat. No. 4,394,664 to Gagliani et al., issued July 19, 1983, discloses foams prepared by reacting pyromellitic dianhydride or 3,3',4,4'-benzophenone tetracarboxylic acid dianhydride and certain oxoimines, esterifying the result, reacting the esterification product with diamine, drying the result to a free-flowing powder or flake and then heating to imidize and condense with liberation of alcohol and water which expand the polymer to a self-supporting cellular structure. Preparation of foamed sheets by heating such polymers in an oven is disclosed in the examples. U.S. Pat. No. 4,426,463 to Gagliani et al., issued Jan. 17, 1984, discloses foams of increased compressive strength prepared similarly but at reduced oxoimine-to-dianhydride ratios and U.S. Pat. No. 4,539,336 to Long et al., issued Sept. 3, 1985, discloses a related preparation in which dianhydride and oxoimine are reacted in alcohol.

From commonly assigned U.S. Pat. No. 3,300,420 to Frey, issued Jan. 24, 1967, it is known to prepare foamed plastics or dense molding resins, depending on reaction conditions, by reaction of trimellitic anhydride and aryl polyisocyanates with liberation of carbon dioxide. According to the patent, carrying the reaction to completion with minimum confinement of polymer results in foam of excellent cell structure and physical properties.

U.S. Pat. No. 3,483,144 to Lavin et al., issued Dec. 9, 1969, discloses in situ preparation of polyimide foams by mixing tetracarboxylic acid and polyamine to form a system with volatiles content of at least 6.2% and heating to simultaneously polymerize and foam. Foaming is said to occur due to volatilization of solvent used in preparation and water vapor evolved from condensation reactions.

U.S. Pat. No. 3,926,911 issued Dec. 16, 1975, and U. S. Pat. No. 3,948,835 issued Apr. 6, 1976, both to Greber et al., disclose silicon-modified polyamides, polyamide-imides or polyimides prepared from polycarboxylic acid compounds and aminosilanes. Use of the polymers to form foams and heating of prepolymer powder in a closed mold to produce hard foam of uniform pore size are disclosed.

While the foregoing disclose certain foams and that residual solvents or reaction by-products, such as water vapor, cause or contribute to foaming, the disclosed foams are prepared in situ during polymerization or by a confined free-rise technique as described above, i.e., by heating in a closed mold. These patents do not address the problems of long processing times, part size/-shape limitations, particle size effects or process complexity and expense.

Also of possible interest in connection with this invention is *Modern Plastics Encyclopedia*, Vol. 54 No. 10A (1977–1978), pp. 294–302, discussing generally various types of conventional thermoplastic foams and production thereof, including profile extrusion with vacuum sizers or sizing dies and structural foam molding. Foaming of polyamide-imides and problems associated with control of foaming of such resins due to volatiles evolved during heating of the same are not addressed.

As can be appreciated, there is a need for a process for manufacture of polyamide-imide foams having useful properties at greater production rates than previously achieved with greater flexibility as to part size.

It is an object of this invention to provide such a process. A further object is to provide a continuous process for preparing polyamide-imide foams. A further object is to provide a method for producing high strength, foam comprising polyamide-imide having utility in applications such as automotive or aerospace insulation materials and firewalls. A still further object is to provide for production of polyamide-imide foam parts with flexibility as to part size and geometry and at greater production rates with better control over foaming than offered by known techniques.

We have found that the objects of this invention can be achieved by extruding a foamable composition comprising softened, fused polyamide-imide and volatiles into a confined expansion zone, expanding the foamable composition in the confined expansion zone and cooling the expanded composition. Advantageously, foam density is easily controlled and foam parts of large or small size can be prepared. Further, the process can be conducted continuously, and with good control over foaming, thereby offering advantages over known techniques in terms of process speed and reliability. Further, particle size effects encountered in confined free-rise foaming are eliminated in the invented process by softening and fusing a foamable composition comprising polyamide-imide and volatiles before introduction of the composition into a confined expansion zone. The invented process is more flexible as to part size and density than short shot injection foaming. Further, other things being equal, the invented process offers advantages as to production rates because parts are prepared by an extrusion process which allows for production of parts that are continuous in one dimension, as opposed to the closed molds used in both short shot injection foaming and confined free expansion. Foams comprising polyamide-imide prepared according to the present invention, like those prepared by known techniques, exhibit a desirable combination of density, structural strength, insulating and other properties. The foams have a substantially open cell structure with cell sizes and shapes being comparable to those of known, intentionally prepared polyamide-imide foams. As prepared, the foams usually are encased within essentially continuous polyamide-imide skins, the densities of which equal or approach those of the solid, unfoamed polyamide-imide composition used in the invented process at the surface of the foamed part and decrease toward its interior. Such skins, while providing extra strength, can be removed easily if desired. The skins may have utility as regrind polymer in the invented process.

DESCRIPTION OF THE INVENTION

Briefly, the invented process comprises extruding a foamable composition comprising softened, fused polyamide-imide and volatiles into a confined expansion zone, expanding the foamable composition in the confined expansion zone and cooling the expanded composition.

The invented process is illustrated in the drawing, in which.

Suitable polyamide-imides comprise recurring polyamide-imide units in polyamide-amic acid form (I), polyamide-imide form (II) or both. They also may contain units of other types. Isophthalamide and terephthalamide units are specific examples Units in the form of I and II are represented by the following formulas and can be linked to units of like or different form in head-to head, head-to-tail or tail-to-tail manner.

In the formulas, → denotes isomerism, R is a divalent, wholly or largely aromatic hydrocarbon radical, preferably of about 6 to about 10 carbon atoms, or two or more divalent aromatic hydrocarbon radicals, preferably each of about 6 to about 10 carbon atoms, joined directly or by one or more stable linkages, such as a covalent carbon-carbon bond, oxy, alkylene (e.g. methylene, isopropylidene), carbonyl, sulfonyl, sulfide, etc. R can be a combination of two or more radicals to provide a copolymer, terpolymer, etc.

Polyamide-imide units in polyamide-amic acid form, as represented by formula I, are capable of undergoing imidization to polyamide-imide form; accordingly, for purposes hereof, the term "polyamide-imide" refers to compositions comprising recurring units in polyamideamic acid form, polyamide-imide form, or both. Weight average molecular weights of about 3,000 to about 13,000 are typical.

Polyamide-imides can be prepared from reactants comprising trimellitic acid compound and one or more wholly or partially aromatic primary diamines or fully or partially acylated diamines. Use of acylated diamines is disclosed in U.S. Pat. No. 4,309,528 to Keske et al., issued Jan. 5, 1982, which is incorporated herein by reference. Usefully, trimellitic anhydride or an acyl halide derivative thereof is used; 4-trimellitoyl anhydride chloride is preferred. Other carboxylic acid components can be used in combination with trimellitic acid component.

Useful aromatic diamines include para- and meta-phenylenediamine, oxybis(aniline), thiobis(aniline), sulfonylbis(aniline), diaminobenzophenone, methylenebis(aniline), benzidine, 1,5-diaminonaphthalene, oxybis-(2-methylaniline) and thiobis(2-methylaniline). Examples of other useful aromatic primary diamines are disclosed in U.S. Pat. No. 3,494,890 issued Feb. 10, 1970, and U.S. Pat. No. 4,016,140, issued Apr. 5, 1977, both to Morello and incorporated herein by reference. When a single diamine is used, meta-phenylenediamine or oxybis(aniline) is preferred. When a mixture of aromatic primary diamines is used it preferably comprises p,p'-oxybis(aniline) and meta-phenylenediamine, or p,p'-sulfonylbis(aniline) and p,p'-methylenebis(aniline). In the former mixture, most preferably, the molar ratio of p,p'-oxybis(aniline) to meta-phenylenediamine is about 50:50 to about 90:10.

Polyamide-imides prepared by reaction of components comprising trimellitic acid component and aromatic diamine comprise polyamide-amic acid wherein the linking groups are predominantly amide groups, although some may be imide groups, and wherein the structure contains free carboxylic acid groups capable of further reaction. Products of this reaction have up to about 50 mole % imidization, typically about 10 to about 40 mole %. Heat treatment, preferably at about 175° C. to about 235° C. for a period of hours, can be conducted to increase imide content as desired. Polyamide-imide softening temperatures typically increase with increasing imide content and molecular weight. It is preferred to employ polyamide-imides having inherent viscosities of about 0.25 dl/g to about 0.7 dl/g in N-methyl pyrollidone to minimize temperature requirements in the invented process. Controlling the extent to which heat treatment of the products of the polymerization reaction described above is conducted is a convenient way to control inherent viscosity.

Usually, the polymerization reaction is carried out in the presence of a nitrogen-containing, organic polar solvent, such as N-methylpyrrolidone, N,N-dimethylformamide or N,N-dimethylacetamide. The reaction should be carried out under substantially anhydrous conditions at a temperature below about 150° C., most advantageously, at about 20° C. to about 50° C. Reaction time depends primarily on temperature, generally varying from about 1 to several hours, about 2 to 4 hours at about 30° C. to about 50° C. being preferred when a nitrogen-containing solvent is used.

Polyamide-imides used in the invented process can contain additives of the type conventionally used with such polymers, e.g. process aids, pigments, etc. The polymers can be used in the invented process with or without prior heating to dry the same. Preferred polyamide-imides are those having Tg of about 220° to about 280° C. Examples of preferred polyamide-imide compositions for use according to the invention are those designated Torlon ®4203L and 9000T polyamide-imides, having unfoamed densities of 1.4 g/cm$^3$ and inherent viscosities of about 0.5–0.6 dl/g and about 0.3 dl/g, respectively, in N-methyl pyrrolidone, and available from Amoco Performance Products, Inc.

Foamable compositions comprising polyamide-imide blended, alloyed or combined with one or more other polymers also may be used. Examples of other polymers that may be suitable include polyesters, polyarylates, polycarbonates, polyimides, polyamides, polyphenylene sulfides, polyphenylene sulfones, polyphenylene oxide, polyether-imides, polyarylether sulfones and other polyarylethers. Filled polyamide-imide compositions containing particulate or fibrous materials, e.g., graphite powder or mineral fillers, glass, graphite, or organic fibers, also can be employed though filler levels above about five weight percent can lead to less efficient foaming due to increases in the viscosity of the softened, foamable composition. Higher filler levels may be more suitable in foamable compositions containing polyamide-imide and other polymers that reduce viscosity.

The foamable composition is extruded into a confined expansion zone within which expansion takes place. With appropriate extruder die or outlet modifications to achieve suitable confinement, as described more fully below, any suitable extrusion equipment capable of processing polyamide-imide compositions can be used for extrusion of a foamable composition comprising polyamide-imide and volatiles. Single- and multiple-screw equipment can be used, with a twin-screw extruder being preferred to maximize throughput. Softening and fusion of polymer and generation of volatiles take place during working of the polymer between flights of a screw or screws which also serve to convey the foamable composition to the extruder outlet. Volatiles typically comprise water vapor and carbon dioxide; vaporized residual solvent from polymer preparation and decomposition products of such solvent also may be present. Screw speed and extruder barrel temperature should be such as to achieve adequate working and softening but not so high as to degrade the composition being processed. Preferably, for foamable compositions with inherent viscosities of 0.25 to 0.7 dl/g, screw speeds range from about 25 rpm to about 200 rpm. At such screw speeds, barrel temperatures of about 65° C. to about 150° C. above Tg generally are employed to heat the foamable composition to about 65° C. to about 125° C. above Tg. In the case of foamable compositions in which the polymer consists solely of polyamide-imides preferred for use according to this invention, preferred barrel temperatures are about 300° C. to about 400° C. When the foamable composition has multiple Tgs, as in an immiscible blend of polyamide-imide and another polymer of different Tg, heating is above the highest Tg of the composition. Substantial escape of volatiles through the extruder feed port is prevented by maintaining a melt seal in the extruder barrel.

Softened, fused, foamable composition is extruded into a confined expansion zone in which expansion and cooling of the expanded composition occur. The confined expansion zone also establishes limits for expansion of the foamable composition in the plane normal to the direction of passage through the zone. To provide adequate space for expansion the area of the confined expansion zone in the plane normal to the direction of passage of extrudate through the zone is greater than the cross-sectional area of the orifice(s) in the extruder outlet from which the extrudate issues. Area of the confined expansion zone in such plane is not so great that the expanding foamable composition cools sufficiently to prevent further expansion prior to expanding to the boundary of the confined expansion zone. The confined zone is not restricted in the direction of passage of the expanded foamable composition therethrough; accordingly, the invented process can be operated with continuous removal or take-off of foam comprising polyamide-imide. For a given confined zone, control over foam densities is achieved by adjustment of take-off rates and extrusion rates as can be determined by persons skilled in the art by routine experimentation in accordance herewith including the examples appearing hereinbelow.

The configuration of the confined expansion zone in the plane normal to the direction of passage of extrudate is such that the expanding extrudate can expand essentially uniformly to the boundaries of the zone and be removed continuously therefrom. Accordingly, the confined expansion zone preferably is free of bends and constrictions and should be of either uniform cross-sectional area along its length or of increasing area with increasing distance from the extruder outlet. Preferably, the zone is of relatively simple shape, such as a circle, ellipse, square or rectangle, although with appropriate extruder outlet modifications and depending on the manner in which the confined expansion zone is provided, more complex shapes, such as a tube or pipe, crescent, "L", "T", "I", "S", etc., can be produced. For polyamide-imide foams of given shape, precise dimensions of the confined expansion zone can be determined by persons skilled in the art by routine experimentation in accordance herewith including the examples appearing hereinbelow.

Figure 1:
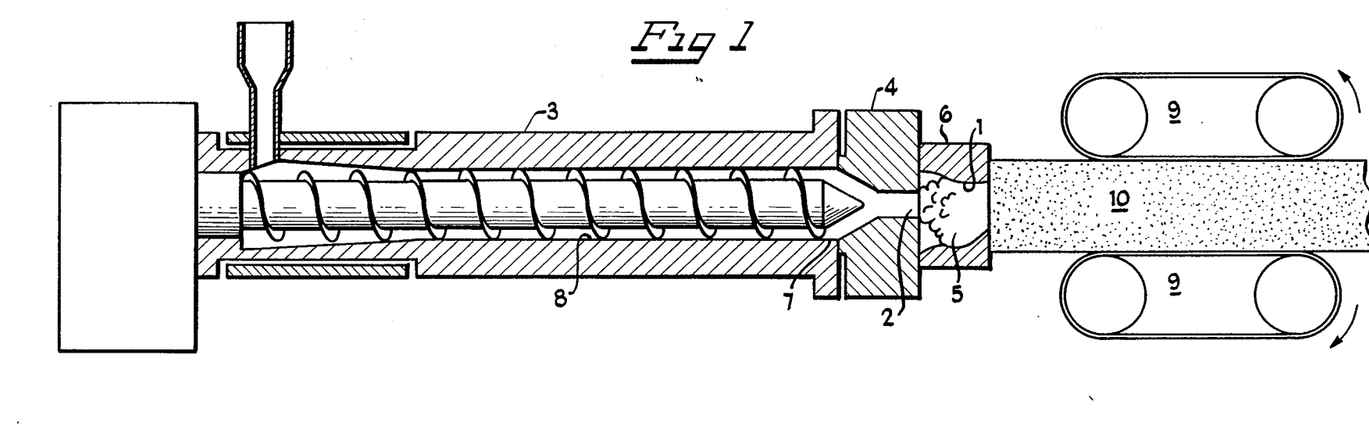
FIG. 1 is a side view of an embodiment of the invented process wherein a confined expansion zone is provided by a forming die fitted to an extruder outlet.

In one embodiment of the invention, illustrated in FIG. 1, the confined expansion zone 2 is provided by fitting the outlet 2 of extruder 3, e.g., extrusion die 4 or end 7 of the barrel 8 if no die is used, with a-suitable forming die to receive the foamable composition 5 issuing from the outlet. Preferably, the forming die is in the form of a ring or hollow cylinder as depicted by character 6 [5] (a portion of which is cut away in the Figure) having a bore of greater cross-sectional area than the extruder outlet. The forming die can also be such that the interior surface(s) thereof define other shapes, as discussed above. The foamable composition is extruded continuously into the forming die and expands therein to fill the die. Contact between the expanded mass and the inner surface of the forming die cools the mass and cooled, expanded mass is removed continuously from the die, for example, using a mechanical puller 9. The forming die is constructed of any material suitable for so-called melt processing of polyamide-imides, e.g., tool steel. Foaming by extrusion into a forming die is particularly suited for production of foam tubes, rods, cylinders, panels, beams or boards.

Figure 2:
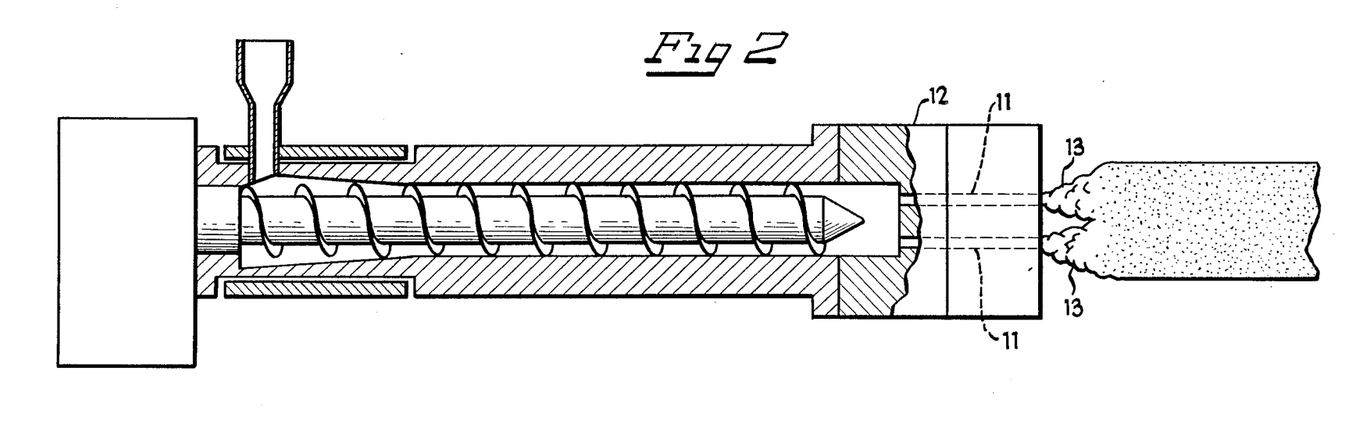
FIG. 2 is a side view of an embodiment of the invented process wherein a confined expansion zone is provided as a result of extruding a foamable composition through a plurality of holes in an extruder die.

Alternatively, as illustrated in FIG. 2, composition can be extruded through a plurality of holes in an extruder outlet, with or without a breaker plate assembly as depicted by character 12, with the holes arranged such that a confined expansion zone is provided as a result of contact of the expanding strands of extrudate 13 exiting the holes. Optionally, the extruder is also fitted with a forming die as described above and foamable composition is extruded through the holes and then into the forming die and then removed therefrom. Spacing and diameter of the holes are such that the expanding composition exiting each hole is confined by the expanding composition exiting at least one other hole. Preferably, to permit suitable expansion of extrudate issuing from the holes, confinement of the expanding composition and consolidation thereof into a substantially uniform foam product, diameters of about 0.05 inch to about 0.5 inch (about 0.13–1.3 cm) are employed, with the distance from the center of one hole to the center of at least one adjacent hole ranging from about 0.05 inch to about 0.5 inch (about 0.13–1.3 cm). Foaming by extrusion through a plurality of holes is best suited for production of foamed boards, sheets or panels although more complex shapes also can be achieved.

Cooling of foamed extrudate to below Tg of the foamable composition (and below its lowest Tg in the case of a composition with multiple Tgs) takes place in the confined zone as the composition expands to the boundaries of the confined zone, e.g., the inner diameter of a forming die or point at which further expansion is prevented due to cooling in the case of extrusion through a plurality of holes. If desired, the confined zone can be heated to adjust the cooling rate or facilitate use of a larger forming die than otherwise would be suitable. The resulting, cooled, foamed extrudate is removed from the confined zone by any suitable means. Thereafter, the foamed product can be cut or otherwise formed into desired shape or used in the form produced.

It also is contemplated to employ additives in the invented process to improve control over or enhance foaming or otherwise modify foam properties or improve processing. Suitable additives for enhancing foaming include aluminum hydroxide, beryllium selenate, iron(II)sulfate pentahydrate, nickel bromide trihydrate, borox and other materials that liberate water or other volatiles at or below the processing temperature employed. Physical blowing agents, e.g., nitrogen gas, or chemical blowing agents, also can be used, although they are not normally necessary or preferred in the invented process. Flow improvers, pigments, stabilizers and other additives also can be used. Hollow particles such as glass spheres also can be included in the foamable composition. The present invention is better suited to use of such materials than confined free-rise foaming because the high shear techniques used to soften and fuse the polymer in the invented process promote dispersion of additives in the foamable composition.

Foams prepared according to the invention are substantially open-celled products having properties comparable to the intentionally foamed polyamide-imide products described above. The foams can be used in the form prepared, cut into other shapes, further shaped by application of heat and pressure or otherwise machined or formed into shaped articles of desired size and shape. Skins of polyamide-imide, typically of decreasing density toward the core of the foam, which may make up as much as sixty percent of the weight of the foamed part, can be removed, e.g., with a saw or other cutting device, or retained, depending on end use requirements.

The following examples illustrate various techniques for preparing foams comprising polyamide-imide, Comparative Examples A–D and F illustrating confined free rise and short shot injection foaming and those designated Invention Examples 1–6 illustrating the present invention. It is to be understood that the examples are for purposes of illustration and not limitation.

COMPARATIVE EXAMPLE A

Confined free rise foaming according to the prior art was conducted using 93 grams of Torlon ®4203L, a commercial polyamide-imide from Amoco, having density of about 1.4 g/cm$^3$, inherent viscosity of 0.55 dl/g in N-methylpyrrolidone, Tg of about 250° C. and containing one-half wt.% polytetrafluoroethylene and three wt.% titanium dioxide, in the form of disc-shaped pellets of approximately 0.08 inch (about 0.2 cm) average length and approximately 0.12 inch (about 0.3 cm) average diameter. The pellets were placed in a mold constructed of tool steel defining a six inch (15.2 cm) diameter, disc-shaped cavity. The mold consisted of a cylinder with a stationary bottom plate and a floating top plate. Both the pellets and the mold were initially at ambient temperature. The pellet-containing mold was closed and placed in a muffle oven and heated therein to 350° C. over a period of twenty minutes, after which the mold was removed from the oven and allowed to cool at ambient temperature. The mold was then opened and a skinless, rigid, foam polyamide-imide disc having a diameter of six inches (15.2 cm) and volume of 28.3 cubic inches (464 cm$^3$) was removed.

Visual inspection revealed a foam of open-cell structure with cells of generally spherical shape and diameters of about 0.09±0.03 inch (about 0.23±0.08 cm). Density of the foam was about 0.25 g/cm$^3$. Compressive strength at 5% deflection, according to ASTM D1621, was 700 psi (49.3 kg/cm$^3$). Screw fastener retention was 35 pounds (16 kg). K factor, determined according to ASTM C518, was 0.5 Btu in/ft$^2$ hr. ° F. (1.7×10$^{-4}$ cal/sec cm ° C.). The foam charred but did not burn on exposure to a flame from a propane torch for two minutes.

COMPARATIVE EXAMPLE B

Following essentially the procedure of Comparative Example A but using a mold with a twelve inch (30.5 cm) diameter, disc-shaped cavity, 1,111 grams Torlon ®4000T polyamide-imide, a commercial polyamide-imide powder from Amoco having density of 1.4 g/cm$^3$, inherent viscosity in N-methylpyrrolidone of about 0.5 dl/g, Tg of about 250° C. and with average particle size of about 0.02 inch (about 0.5 mm), were heated in the mold, using a Wabash compression press platens as the heat source, to 370° C. for one hour and then cooled. A rigid foam disc having a volume of about 113 cubic inches (1852 cm$^3$), density of 0.6 g/cm$^3$ and open cell structure was obtained. This procedure was repeated using 715 grams of the polyamide-imide to prepare a foam disc with density of 0.386 g/cm$^3$ and open cell structure.

To further evaluate the 0.386 g/cm$^3$ density foam disc, blocks were cut from randomly selected locations throughout the disc, their dimensions and weights were measured and densities were calculated. Results were as follows:

| Block No. | Dimensions (L × W × H in cm) | Volume (cm$^3$) | Weight (g) | Density (g/cm$^3$) |
|---|---|---|---|---|
| 1 | 2.57 × 2.79 × 1.21 | 8.68 | 3.3826 | 0.39 |
| 2 | 2.60 × 2.79 × 1.24 | 9.03 | 3.3652 | 0.37 |
| 3 | 2.76 × 2.55 × 1.14 | 8.01 | 3.1497 | 0.39 |
| 4 | 2.70 × 2.57 × 1.10 | 7.65 | 3.1144 | 0.41 |
| 5 | 2.79 × 2.53 × 1.19 | 8.40 | 3.2682 | 0.39 |
| 6 | 2.73 × 2.50 × 1.21 | 8.23 | 3.2158 | 0.39 |
| 7 | 2.46 × 2.72 × 1.24 | 8.29 | 3.1361 | 0.38 |
| 8 | 2.74 × 2.52 × 1.18 | 8.16 | 3.0779 | 0.38 |
| 9 | 2.71 × 2.58 × 1.16 | 8.11 | 3.0291 | 0.37 |
| 10 | 2.62 × 2.72 × 1.14 | 8.11 | 3.0935 | 0.38 |
| Average of 1-10 | | | | 0.39 |

COMPARATIVE EXAMPLE C

Following essentially the procedure of Comparative Example A, varying amounts of polyamide-imide of the type used in that example were heated in a closed mold at various temperatures and for various periods of time as shown in the following table. In all cases a rigid, open-cell foam disc was obtained. Unless otherwise indicated, cells of the foamed discs were acceptable in size and shape and essentially free of char.

| Sample | Oven Temperature (°C.) | Heating Time (hours) | Density (g/cm$^3$) | Comments |
|---|---|---|---|---|
| A | 371 | 1 | 0.388 | |
| B | 371 | 2 | 0.287 | |
| C | 371 | 3 | 0.287 | Badly charred |
| D | 399 | 1 | 0.276 | |
| E | 399 | 2 | 0.258 | Surface charred |
| F | 399 | 3 | 0.269 | Badly charred |
| G | 427 | 1 | 0.277 | Large void, slight char |
| H | 427 | 2 | 0.240 | Large void, charred |
| I | 482 | 1 | 0.208 | Large void, charred |

COMPARATIVE EXAMPLE D

Following essentially the procedure of Comparative Example A, two samples of a blend made by melt extruding 80 wt% particulate polyamide-imide having inherent viscosity of 0.55 dl/g in N-methyl-pyrrolidone and Tg of about 250° C. and 20 wt% particulate polyarylethersulfone having Tg of about 222° C. and identified as Victrex ®600P from I.C.I., were heated for one and two hours, respectively, at 399° C. and then cooled. After cooling, rigid foams conforming in shape and dimensions to the surfaces defining the mold cavity and having densities of 0.41 g/cm$^3$ and 0.33 g/cm$^3$, respectively, were removed. Both foams had open cell structure with cells of generally spherical shape and about 0.09 inch (about 0.23 cm) diameter.

COMPARATIVE EXAMPLE E

While confined free-rise foaming is limited as to part size and geometry, foams prepared by that technique can be shaped by subsequent forming. To demonstrate such further shaping, a 0.5 inch (1.27 cm) thick, 3 inch (7.62 cm) long, rigid, foam sheet prepared following essentially the procedure of Comparative Example B was dried in a forced air circulating oven at about 121° C. to 149° C. for 24 hours. The dried sheet was then placed in a "U"-shaped fixture and heated therein at about 289° C. for sixteen hours, during which mild stress was applied to the sheet with a free standing weight. Heating was discontinued, the fixture was allowed to cool at ambient temperature and a foam sheet conforming to the shape of the fixture was removed. Such a technique also can be utilized to shape foams prepared by the invented process.

COMPARATIVE EXAMPLE F

A block comprising polyamide-imide foam with a solid or essentially solid polymeric outer skin may be prepared from the polyamide-imide used in Comparative Example A using a 500 ton, 40 oz Natco injection molding press fitted with a 1:1 compression screw, spring loaded shutoff nozzle, accumulator and a carbon steel mold defining a 2 inch (5.1 cm) by 2 inch (5.1 cm) by 6 inch (15.2 cm) cavity. Mold temperature is 150° F. (65.6° C.), cylinder temperature is 670° F. (354° C.), injection rate is 40 oz/sec (1183 cm$^3$/sec) and injection stroke is 25%. No cushion is used. The entire shot is forced into the mold, allowed to expand therein, cooled and then the block is ejected from the mold.

INVENTION EXAMPLE 1

Polyamide-imide of the type used in Comparative Example A was extruded from a single screw, ¾-inch Brabender extruder equipped with a nylon screw, strand die having a die orifice of 0.953 cm diameter and a cylindrical, stainless steel, six inch (15.24 cm) long forming die having an inner diameter of 6 cm and disposed concentrically in relation to the die aperture. The screw was rotated at 100 rpm and temperature of the extruder barrel was 390° C. The polymer was conveyed through the barrel, heated therein, and extruded into the forming die in which expansion took place. The expanded extrudate cooled in the forming die and a rigid, foam rod of 6 cm diameter was continuously removed from the forming die by hand and cut into three-foot segments. The core of the foam exhibited substantially open cell structure with generally spherically shaped cells and substantially uniform density throughout. Density of the foam rod after removal of skin was 0.25 g/cc.

INVENTION EXAMPLE 2

Polyamide-imide of the type used in Comparative Example A, but containing one wt.% polytetrafluoroethylene, was dried for sixteen hours at 149° C. and then amounts of the dried polymer were dusted with Expandex ®150, a high temperature, chemical blowing agent based on the calcium salt of 5-phenyltetrazole, from Olin Corporation, in amounts corresponding to the weight percentages shown in the table appearing below. Following essentially the procedure of Invention Example 1, but using a 1¼ inch (3.2 cm) inner diameter, 4 inch (10.16 cm) long, stainless steel forming die and barrel temperatures of 310° C. at the feed end of the extruder, 360° C. in an intermediate zone and 390° C. at the die, rigid, foam rods of open cell structure and having the densities shown below, after removal of skins, were produced.

| Sample | Expandex ® (wt. %) | Density (g/cm³) |
|---|---|---|
| A | 0.125 | 0.30 |
| B | 0.25 | 0.30 |
| C | 1.0 | 0.26–0.32 |

INVENTION EXAMPLE 3

Rigid, open cell foams comprising polyamide-imide and having various densities were prepared from various compositions by extrusion using a 1¼ inch (3.2 cm) single screw Brabender extruder equipped with a two stage screw and fitted with a forming die 6 inches (15.2 cm) long by 3½ inches (8.9 cm) square. The forming die was fitted directly to the outlet of the extruder barrel without use of an extrusion die. Screw speed was 76 rpm and barrel temperature was 390° C. Expanded extrudate was continuously removed from the forming die using a Galto Cat-a-puller, a mechanical puller. Results were as follows:

| Composition | Density (g/cm³) | Compressive Strength (psi at 5% deflection) |
|---|---|---|
| 1. Commercial polyamide-imide phthalamide (IV = about 0.33 dl/g in N-methylpyrollidone, Tg = about 260° C.) | 0.23 | 200 (14.1 kg/cm²) |
| 2. 80 wt. % polyamide-imide of the type used in Comparative Example A blended as described in Comparative Example D with 20 wt. % polyethersulfone of the type described in Comparative Example D | 0.35 | 1100 (77.4 kg/cm²) |
| 3. Polyamide-imide of the type used in Comparative Example A | 0.26 0.36 | 350 (24.6 kg/cm²) 500 (35.2 kg/cm²) |

INVENTION EXAMPLE 4

Following essentially the procedure of Invention Example 3, but with addition of an adapter and a breaker plate assembly, polyamide-imide of the type used in Comparative Example A was extruded into the forming die and a foamed rod of square cross-section and open cell structure, with relatively large cells in the center of the foam and heavy outer skin, was removed therefrom. Density of the rod, including skin, was 0.3 g/cm³. The adapter and breaker plate assembly were located between the end of the extruder barrel and the forming die. The adapter defined a conical bore tapering outwardly away from the end of the extruder barrel. The breaker plate was 3½ inches (8.9 cm.) square with nine 0.25 inch (0.6 cm.) diameter holes, each communicating with the bore of the adapter, in a 3×3 square pattern.

INVENTION EXAMPLE 5

Undried polyamide-imide of the type used in Comparative Example A was metered from a K-tron T-20 volumetric feeder at about 20 pounds per hour (9.1 Kg/hour) into the throat of a Werner Pfleiderer ZSK-30 twin screw extruder fitted with a 22 hole die with streamlined entrance sections and ⅛ inch (0.32 cm) diameter holes spaced ⅜ inch (0.95 cm) center to center disposed in two parallel rows of eleven holes each. The extruder barrel was heated to 270° C. at the feed throat and higher temperatures along its length up to a maximum of 380° C. at the die. Polyamide-imide was conveyed through the barrel by intermeshing, co-rotating screws and forced from the barrel through the die by the action of the screws, forming 22 strands that expanded to consolidate into a sheet 6 inches (15.2 cm) wide and 1½ inches (3.8 cm) thick. The sheet cooled as it was pulled over a support trough using a Galto Cat-a-puller and into a Galto cut-off saw. The cooled, rigid, foam sheet was cut into various lengths. Outer skin was cut off with the saw and panels about ¾ inch by 4 inches by about 36 inches (about 1.9×10.2 ×90 cm) were cut. Densities were 0.29 g/cm³, shear strength was 536 psi (37.7 kg/cm²) and shear modulus was 189,250 psi (13,318 kg/cm²).

A rigid, foam sheet with density of 0.208 g/cm³ was prepared in like manner. After removal of skin, blocks were cut from randomly selected locations at each end and in the middle of the 0.208 g/cm³ density foam sheet, their dimensions and weights measured and densities calculated. Results were as follows:

| Block No. | Dimensions (L × W × H in cm) | Volume (cm³) | Weight (g) | Density (g/cm³) |
|---|---|---|---|---|
| 1 | 2.62 × 2.59 × 2.01 | 13.65 | 2.8446 | 0.21 |
| 2 | 2.63 × 2.58 × 2.01 | 13.63 | 2.5619 | 0.19 |
| 3 | 2.52 × 2.63 × 1.99 | 13.18 | 2.6863 | 0.20 |
| 4 | 2.52 × 2.62 × 2.13 | 14.05 | 2.6258 | 0.19 |
| 5 | 2.56 × 2.63 × 1.99 | 13.42 | 2.6988 | 0.20 |
| 6 | 2.50 × 2.59 × 2.15 | 13.91 | 3.6014 | 0.26 |
| 7 | 2.58 × 2.61 × 2.09 | 14.08 | 2.5535 | 0.18 |
| 8 | 2.62 × 2.49 × 1.80 | 11.77 | 3.0665 | 0.26 |
| 9 | 2.54 × 2.61 × 2.02 | 13.39 | 2.5135 | 0.19 |
| 10 | 2.62 × 2.55 × 1.95 | 13.02 | 2.7117 | 0.21 |
| Average Density of Blocks 1–10 | | | | 0.21 |

INVENTION EXAMPLE 6

Following essentially the procedure of Invention Example 5, foam sheets of varying densities were prepared by adjusting the Galto Cat-a-puller take off speed. Extrusion rates were maintained at 20 pounds per hour (9.1 kg/hr) and screw speed was 50 rpm. Take-off speeds and densities after removal of outer skins are shown below.

| Sample | Take-Off Speed (in/min) | Density (g/cm³) |
|---|---|---|
| 1 | 2.5 (6.4 cm/min) | 0.245 |
| 2 | 4.5 (11.5 cm/min) | 0.219 |
| 3 | 6.5 (16.6 cm/min) | 0.192 |
| 4 | 8.5 (21.7 cm/min) | 0.184 |

The foam boards of samples 1 and 2 had the following properties:

| Sample | Shear Strength (psi) | Shear Modulus (psi) |
|---|---|---|
| 1 | 440 (31.0 kg/cm²) | 119920 (8439 kg/cm²) |
| 2 | 363 (25.5 kg/cm²) | 138077 (9716 kg/cm²) |

We claim:

1. A process for producing polyamide-imide foam comprising heating in an extruder a polyamide-imide capable of releasing volatiles comprising water vapor and carbon dioxide on heating, to form a foamable composition comprising softened, fused polyamide-imide and volatiles comprising water and carbon dioxide, extruding the foamable composition through an outlet of the extruder into a zone having greater cross-sectional area than the outlet and adapted to receive the extruded foamable composition and provide a boundary for limiting expansion of the foamable composition in a plane normal to the direction of passage of the composition through the zone, expanding the foamable composition in the zone, cooling the expanded composition and removing the expanded composition from the zone.

2. The process of claim 1 wherein the zone is defined by an inner surface of a forming die fitted to the extruder outlet, such inner surface of the forming die providing the boundary for expansion of the foamable composition and having a length and defining a cross-sectional area effective to allow expansion of the foamable composition to the interior surface and cooling of the expanded composition in contact with such surface without cooling of the foamable composition sufficient to prevent expansion thereof prior to expansion of the foamable composition to the interior surface.

3. The process of claim 1 wherein the extruder outlet comprises an extrusion die having a plurality of holes through which the foamable composition is extruded, spacing and diameter of such holes being such that the boundary for limiting expansion of the foamable composition is provided by expansion of the foamable composition issuing from each hole into contact with expanding foamable composition issuing from at least one other hole.

4. The process of claim 3 wherein diameters of the holes range from about 0.05 inch (0.1 cm) to about 0.5 inch (1.3 cm) and distance from the center of each hole to the center of at least one other hole ranges from about 0.05 inch (0.1 cm) to about 0.5 inch (1.3 cm).

5. The process of claim 1 wherein the cooled expanded mass removed from the zone comprises an essentially continuous outer skin of polyamide-imide and the skin is removed from the cooled expanded mass.

6. A process for producing polyamide-imide foam comprising continuously heating in an extruder a polyamide-imide having unfoamed density of about 1.4 g/cm³, inherent viscosity of about 0.25 to about 0.7 dl/g in N-methyl pyrrolidone and Tg of about 220° C. to about 280° C., and capable of releasing volatiles comprising water vapor and carbon dioxide on heating at a barrel temperature of about 300° C. to about 400° C. and screw speed of about 25 to about 200 rpm to form a foamable composition comprising softened, fused polyamide-imide and volatiles comprising water vapor and carbon dioxide, extruding the foamable composition through an outlet of the extruder into a forming die fitting to the extruder outlet, the forming die having an interior surface defining a greater cross-sectional area than that of the extruder outlet and having a length, said cross-sectional area and length being effective to allow expansion of the foamable composition to the interior surface and cooling of the expanded composition in contact with such surface without cooling of the foamable composition sufficient to prevent expansion thereof prior to expansion of the foamable composition to the interior surface, expanding the foamable composition in the forming die, cooling the expanded composition to below Tg of the composition and removing the cooled, expanded composition from the forming die.

7. A process for producing polyamide-imide foam comprising continuously heating in an extruder a polyamide-imide having unfoamed density of about 1.4 g/cm³, inherent viscosity of about 0.25 to about 0.7 dl/g in N-methyl pyrrolidone and Tg of about 220° C. to about 280° C., and capable of releasing volatiles comprising water vapor and carbon dioxide on heating, at a barrel temperature of about 300° C. to about 400° C. and screw speed of about 25 to about 200 rpm to form a foamable composition comprising softened, fused polyamide-imide and volatiles comprising water vapor and carbon dioxide, extruding the foamable composition through an extruder outlet having a plurality of holes, spacing and diameter of the holes being such that the foamable composition exiting each hole expands into contact with the foamable composition exiting at least one other hole, expanding the foamable composition exiting the holes and cooling the expanded composition to below Tg of the composition.

8. The process of claim 7 wherein the foamable composition exiting the holes is passed through a forming die prior to cooling the foamable composition to below Tg and continuously removed from the forming die, said forming die having an interior surface defining greater cross-sectional area than the extruder outlet and having a length, said cross-sectional area and length being effective to allow expansion of the foamable composition to the interior surface and cooling of the expanded composition in contact with such surface without cooling of the foamable composition sufficient to prevent expansion thereof prior to expansion of the foamable composition to the interior surface.

* * * * *